United States Patent [19]

Thiel

[11] Patent Number: 4,792,022

[45] Date of Patent: Dec. 20, 1988

[54] BRAKE DISC ARRANGEMENT FOR AN INTERNALLY STRADDLING DISC BRAKE, IN PARTICULAR FOR AUTOMOTIVE VEHICLES

[75] Inventor: Rudolf Thiel, Frankfurt am Main, Fed. Rep. of Germany

[73] Assignee: Alfred Teves GmbH, Frankfurt am Main, Fed. Rep. of Germany

[21] Appl. No.: 915,726

[22] Filed: Oct. 6, 1986

[30] Foreign Application Priority Data

Oct. 3, 1985 [DE] Fed. Rep. of Germany ....... 3535290

[51] Int. Cl.⁴ ................... F16D 65/10; F16D 65/78; B21H 1/02; B22D 19/00
[52] U.S. Cl. .................... 188/218 XL; 29/159.01; 164/108; 188/264 AA
[58] Field of Search ........... 188/18 A, 71.6, 218 XL, 188/264 A, 264 AA, 218 R, 370; 301/6 E, 6 W, 6 CS, 6 WB, 6 S; 192/70.12, 113 A, 107 R; 164/108, 111, 98; 29/159.01, 159.1, 159 R

[56] References Cited

U.S. PATENT DOCUMENTS

| | | | |
|---|---|---|---|
| 2,153,280 | 4/1939 | Shelor | 188/218 XL |
| 2,289,689 | 7/1942 | Wilson | 188/218 XL |
| 2,655,227 | 10/1953 | Eksergian | 188/370 X |
| 3,478,850 | 11/1969 | Abu-Akeel | 188/218 XL |

FOREIGN PATENT DOCUMENTS

| | | |
|---|---|---|
| 2015873 | 10/1970 | Fed. Rep. of Germany . |
| 2120433 | 12/1971 | Fed. Rep. of Germany . |
| 3436973 | 4/1986 | Fed. Rep. of Germany . |
| 2100193 | 3/1972 | France . |
| 1149126 | 4/1969 | United Kingdom ......... 188/218 XL |
| 2162260 | 1/1986 | United Kingdom ............... 188/71.1 |

Primary Examiner—Andres Kashnikow
Assistant Examiner—Robert J. Oberleitner
Attorney, Agent, or Firm—James B. Raden

[57] ABSTRACT

An internally stradding type disc brake for automotive vehicle is disclosed including a brake ring having opposing friction surfaces and spaced apart connecting elements extending radially from the periphery of the brake ring. A brake carrier having spaced apart axially extending connecting sections is provided for wherein each connecting section extends across a space between adjacent connecting elements of the brake ring and are welded to the connecting elements on opposite side of the space.

4 Claims, 3 Drawing Sheets

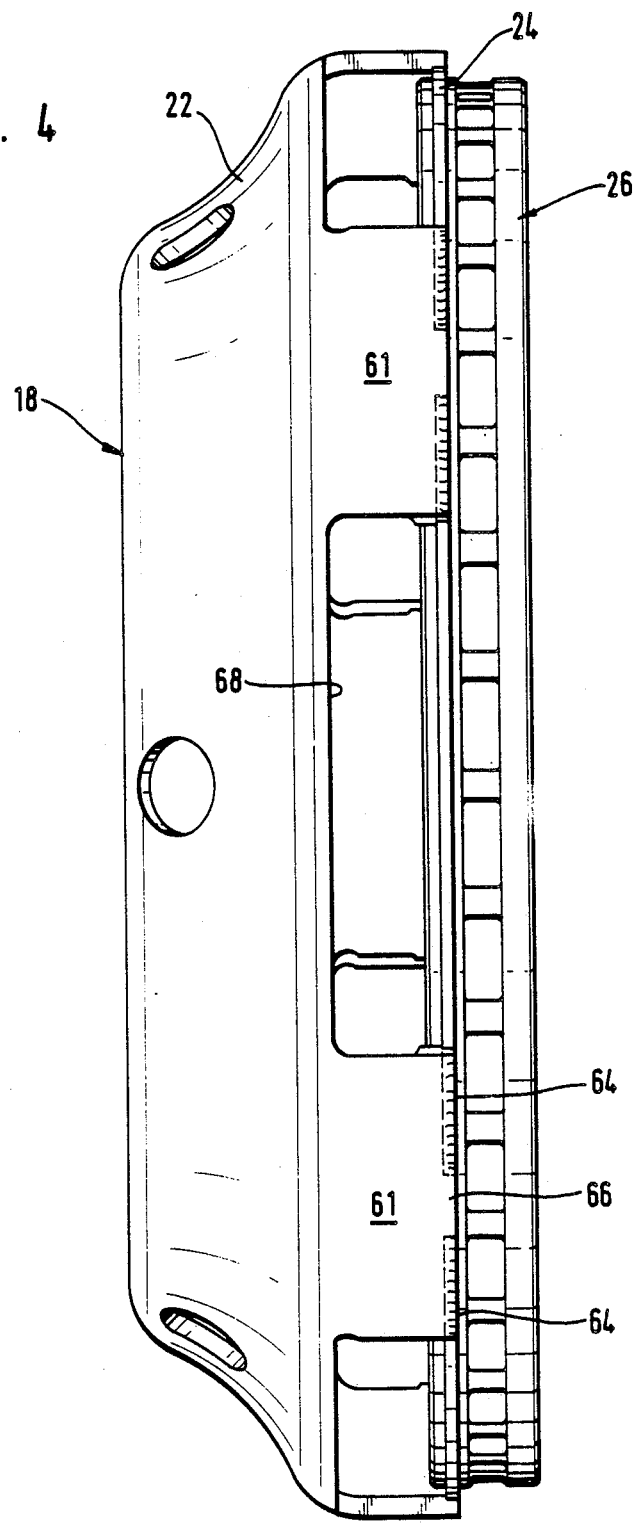

BRAKE DISC ARRANGEMENT FOR AN INTERNALLY STRADDLING DISC BRAKE, IN PARTICULAR FOR AUTOMOTIVE VEHICLES

BACKGROUND OF THE INVENTION

This invention relates to a brake disc arrangement for use in an internally straddling type disc brake, and in particular of the type for automotive vehicles.

A brake disc arrangement of this type is disclosed in the German published patent applications DE-OS No. 34 36 973.2. This known brake disc arrangement includes a cast brake ring having two opposed braking surfaces and a brake disc carrier having at least one connecting section through which it is connected to the brake ring in the region of the brake ring outer periphery. Mounted on the cast brake ring is a substantially radially extending connecting element whose outside diameter is only slightly larger than the outside diameter of the cast brake ring. The brake disc carrier is connected to radially outer sections of the connecting element by means of a weld. This arrangement further provides for the use of several segmental connecting elements evenly distributed along the periphery and forming abutment surfaces for the connecting sections of the brake disc carrier which is configured as one piece.

A short coming of this arrangement lies in the fact that the accuracy of the shape and position of the connecting elements during molding cannot be maintained. This shortcoming is attributable to thermal stresses occurring during the casting process which cause bending of the segments as a result of which the connecting arrangement becomes unsuitable for use in combination with the brake disc carrier.

SUMMARY OF THE INVENTION

Therefore, it is an object of the present invention to provide a connecting arrangement in which the position of the integrally cast connecting elements cannot adversely affect the strength of the connection between the carrier and the cast brake ring.

According to the invention there is provided a brake disc arrangement wherein each connecting section of the carrier spans the space formed between adjacent connecting elements and provides a rigid connection between the brake disc carrier and the cast brake ring.

According to another feature of invention each connecting section of the brake disc carrier is advantageously assembled to the connecting elements by a particularly intensive material-connecting weld process (using, for example, electron beam, laser beam, inert gas metal welding (MIG), active gas metal welding (MAG), tungsten arc welding (WIG) techniques).

BRIEF DESCRIPTION OF THE DRAWINGS

The invention will be described in the following Detailed Description of the Preferred Embodiment with reference to the accompanying drawings wherein:

FIG. 4 is a side elevational view of a brake arrangement having a cup-shaped brake disc carrier employing the principles of the invention.

DETAILED DESCRIPTION OF THE PREFERRED EMBODIMENT

Figure 1:
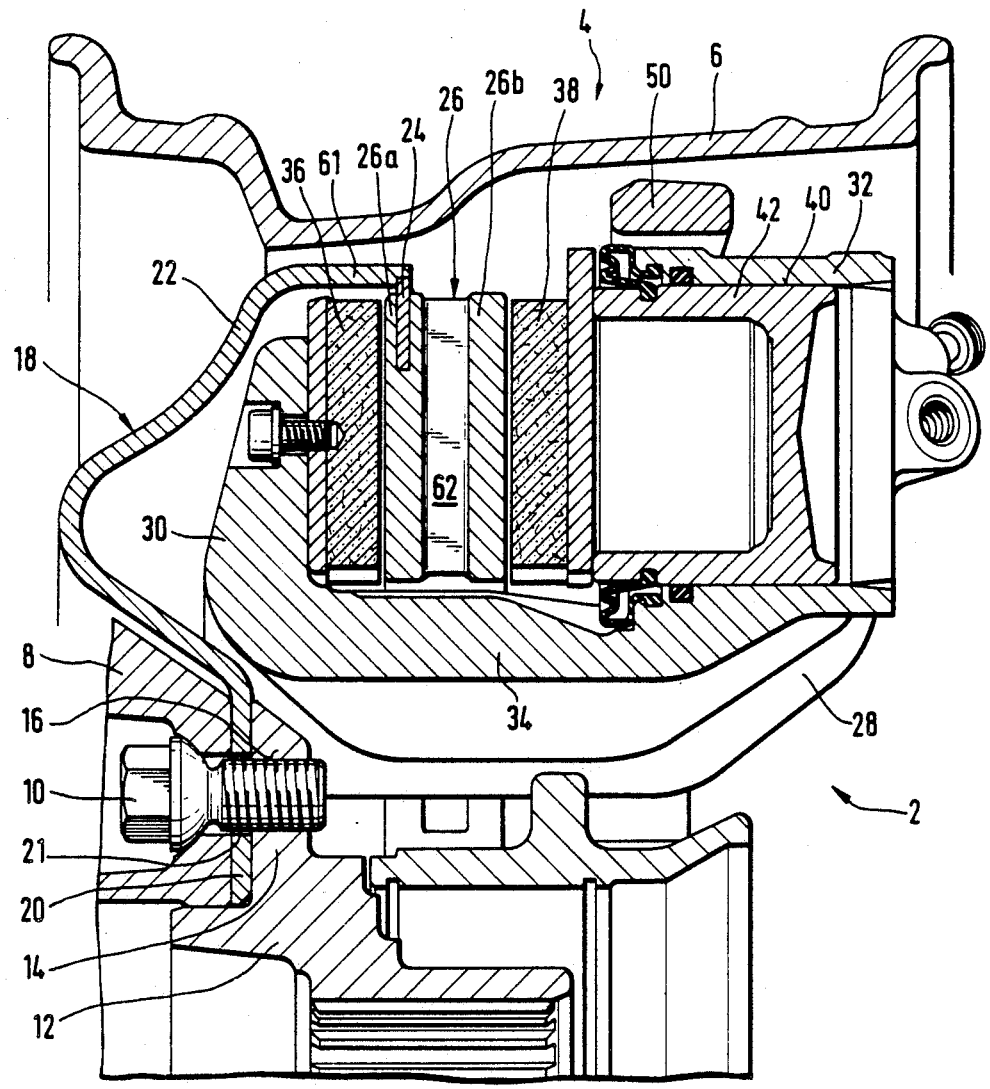
FIG. 1 is a partial longitudinal sectional view of a wheel rim having the internally straddling disc brake arrangement according to the invention arranged therein.

Referring to FIG. 1, there is shown a brake arrangement of the type known as an internally straddling disc brake 2 mounted in a vehicle wheel 4. Of the vehicle wheel, only the wheel rim 6 and part of the wheel dish 8 are shown in the drawing. The vehicle wheel 4 is secured to a wheel bearing housing 12 through the wheel dish 8 by means of a plurality of bolts 10, only one of which is shown. By means of the wheel bearing housing 12, the vehicle wheel 4 is rotatably supported in a bearing (not shown) on a spindle (not shown) which in turn is connected to a steering knuckle of the vehicle. For this purpose, the wheel bearing housing 12 has a flange 14 in which threaded bores 16 are provided to receive the bolts 10. The bolts 10 also serve to fasten a brake disc carrier 18 to the flange 14, with the brake disc carrier 18 being arranged between the flange 14 and the wheel disk 8. As described in more detail hereinbelow, the brake disc carrier 18 has a radially inward, substantially circular fastening section 20 in which bores 21 are provided to receive the bolts 10, as well as a carrier section 22 conformed to the contour of the wheel disc 8 which contour is representative of only one configuration. The carrier section 22 forms an end or connecting section extending substantially parallel to the axis of the wheel and includes a connecting element 24 welded thereto. The connecting element 24 is connected to a friction ring 26 which constitutes the brake disc which is provided with two opposed annular friction surfaces 26a and 26b.

The internally straddling disc brake 2 has a brake housing 28 which, in longitudinal section as shown in FIG. 1, is substantially U-shaped configuration, including two radially outwardly extending legs 30, 32 connected together by a bridging section 34. On either side of the friction ring 26, brake pads 36, 38 are arranged which are straddled by the U-shaped brake housing 28. For operation of the disc brake, the inboard leg 32 has a cylinder bore 40 in which a piston 42 is received in an axially slidable relationship. The piston 42 acts directly upon the inboard brake pad 38, which action generates a reaction during which the brake housing 28 is moved inwardly in the opposite direction, thereby causing the outboard pad 36 to be actuated. For this purpose, the brake housing 28 is slidably carried on a stationary brake support 50.

Figure 2:
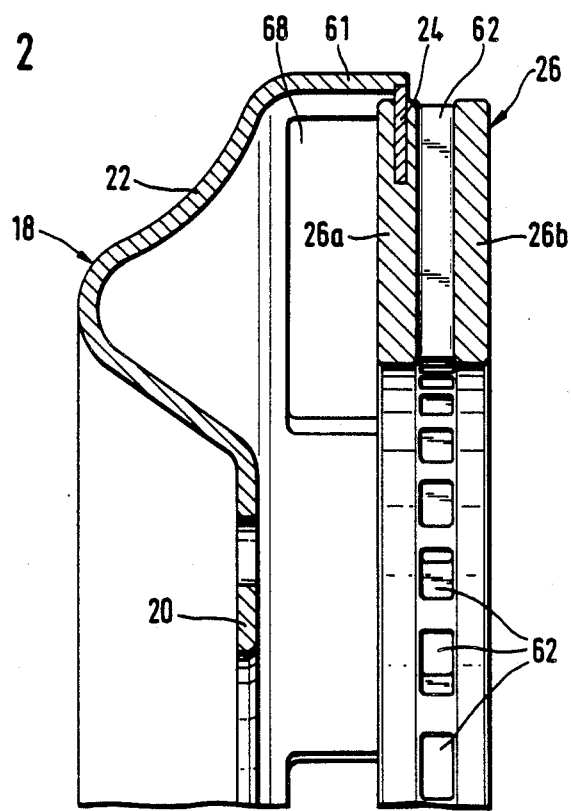
FIG. 2 is a fragmentary sectional view of the brake disc arrangement of FIG. 1.

As shown in FIG. 2, the brake disc arrangement includes a brake disc carrier 18 which may be made of, for example, sheet steel. The brake disc carrier 18 has on its periphery suitably dimensioned openings or cutouts 68 spaced at specific intervals which permit radial removal of the brake pad 36. The brake disc carrier 18, which is configured as one piece, provides a central, substantially circular, fastening section 20 with walls adjacent to the outer periphery which extend outwardly in an inclined direction and form a disc-shaped contour with the fastening section 20. The downward slope of the walls is continued in carrier sections 61 extending substantially parallel to the axis of the wheel.

The carrier sections 61 terminate above the connecting elements 24 which are cast integrally with the friction ring 26 of the brake disc. The friction ring 26 shown in FIG. 2 includes two axially spaced annular friction surfaces 26a, 26b connected together by ribs 62, with ventilation ducts between the ribs.

The connecting element 24 is cast integrally with the annular friction surface 26a on the side close to the brake disc carrier 18 in such a manner that it protrudes radially a slight amount, that is, in the range of between 1.0 mm and 5 mm, and preferably between 1 mm and 2.5 mm, from the friction surface outer periphery. In this arrangement, the difference between the outside diameter of the connecting element 24 and the outside diameter of the annular friction surface 26a corresponds approximately to the sheet steel thickness of the connecting element 24.

Figure 3:
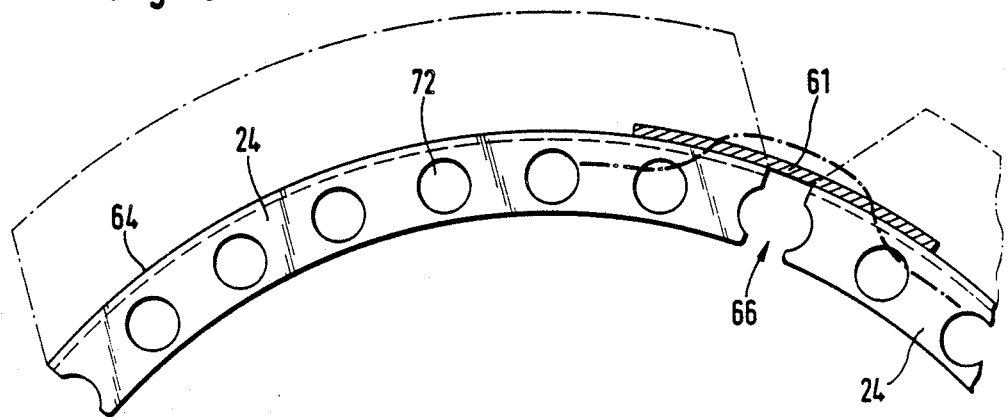
FIG. 3 is a segmental axial view showing one connecting section of the carrier connection adjacent spaced apart connecting elements.

As shown in FIG. 3, the connecting element 24 includes a plurality of bores 72 closed throughout which are penetrated by the material as it is being cast. Prior to the welding operation for attaching the connecting elements 24 to the carrier sections 61, the brake disc carrier 18, which is configured as one piece, is aligned such as to have its connecting sections 61 or the surfaces to be welded together centered relative to the space 66 between two adjacent connecting elements 24. The surfaces are welded together by applying welding techniques which provide a particularly intensive material connecting weld such as, for example, electron beam, laser beam, inert gas welding (MIG), active gas metal welding (MAG) or tungsten arc welding. Accordingly, the weld extends between the connecting section 61 of the brake disc carrier and the abutment surfaces 64 of two opposite connecting elements 24. FIG. 3 further depicts the force distribution during braking from one connecting element by way of the connecting section 61 of the brake disc carrier to the adjacent connecting element. On application of the brake, the structure described ensures that sufficient strength is available when brake torque is being transferred.

What is claimed is:

1. A brake disc arrangement for an internally straddling type disc brake for an automotive vehicle comprising, a cast brake ring having an axis and having two opposed friction surfaces, at least two spaced apart connecting elements distributed along the periphery of the cast brake ring, a one piece brake disc carrier having a main body having an axis coaxial with the axis of said ring and including at least two axially projecting connecting sections, each of the connecting sections of the brake disc carrier projecting away from said main body in the direction of the axis of said main body extends across a space formed between the spaced apart connecting elements, each connecting section fastened to the connecting elements on opposite sides of the space across which it extends.

2. A brake disc arrangement as claimed in claim 1, wherein each said connecting section of the brake disc carrier is disposed symmetrically across the space between the connecting elements across which said connecting section extends.

3. A brake disc arrangement as claimed in claim 2, wherein each said connecting section of the brake disc carrier is permanently affixed to each said connecting element by means of a weld.

4. A brake disc arrangement as claimed in claim 3, wherein said connecting elements extend radially from and are equally distributed along the periphery of the cast brake ring.

* * * * *